June 25, 1940.   P. SCHWARZKOPF   2,205,865
METHOD OF MANUFACTURING ALLOYS, IN PARTICULAR STEEL ALLOYS
Filed Aug. 2, 1939
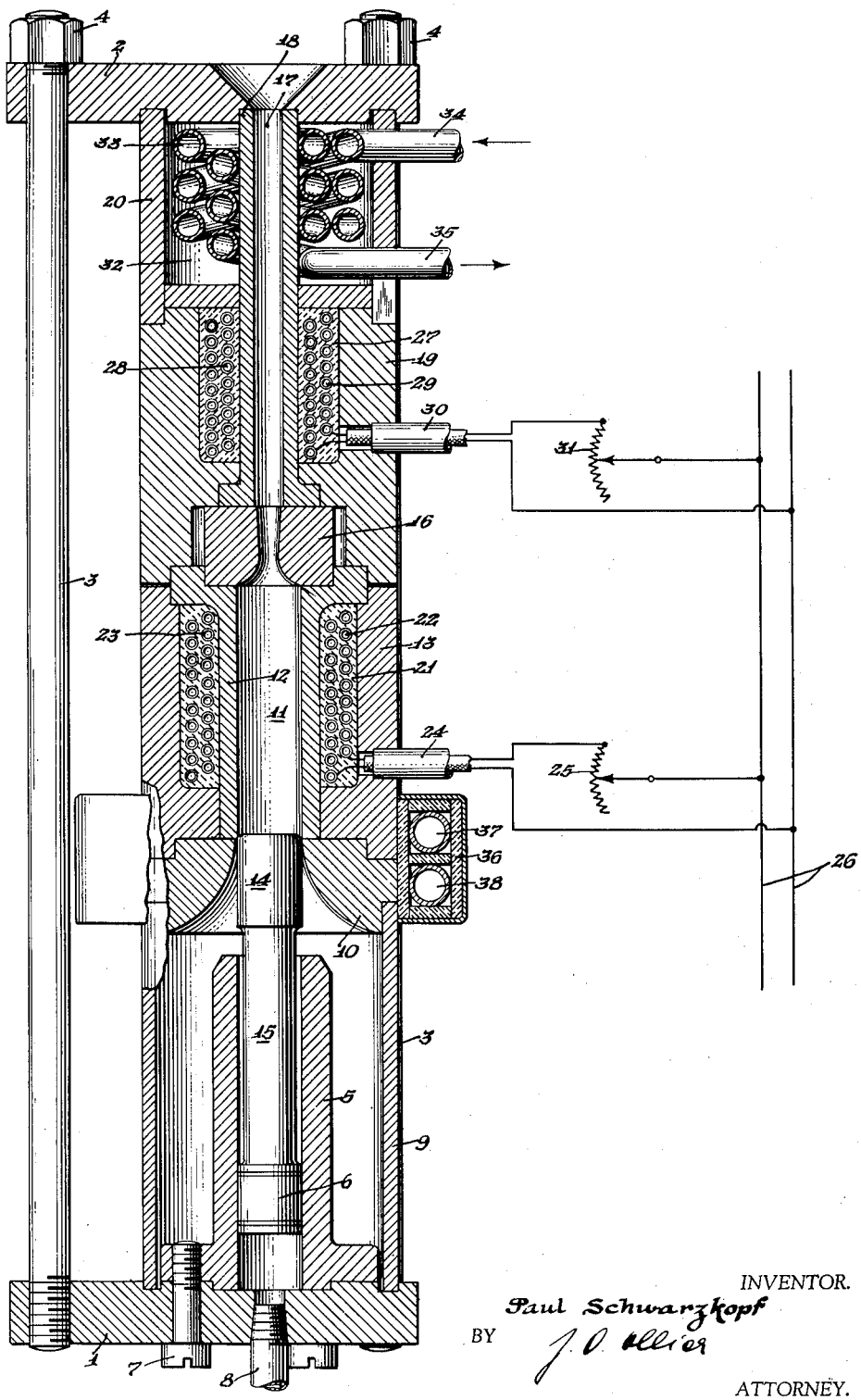
INVENTOR.
Paul Schwarzkopf
BY
ATTORNEY.

Patented June 25, 1940

2,205,865

UNITED STATES PATENT OFFICE 2,205,865

METHOD OF MANUFACTURING ALLOYS, IN PARTICULAR STEEL ALLOYS

Paul Schwarzkopf, New York, N. Y., assignor to American Electro Metal Corporation, New York, N. Y., a corporation of Maryland Application August 2, 1939, Serial No. 287,905

17 Claims. (Cl. 75—122)

This invention relates to a method of manufacturing alloys, in particular steel alloys.

In the manufacture of alloys, particularly steel alloys, it is essential that the base metal and additions are present in the completed alloy in exact proportions. Since the amount of the additions is often very small and of the order of a few percents or even fractions of one percent, great difficulties were encountered in incorporating such small additions into the base material, uniformly dividing those additions therein, and to keep them in such even and finely divided state while the alloy was completed by melting.

It was suggested, therefore, to manufacture alloys of this type by a sintering process as is well known in the so-called powder metallurgy. Such process consists in that the base metal, such as iron, is as finely comminuted as possible and intimately admixed with the desired amount of additional material or materials also in such finely comminuted state. It is convenient first to press the intimate mixture and thereafter to heat it close to but below melting temperature of the mixture so that the particles coalesce and weld into a dense body in which the base material as well as the additions are still uniformly and finely distributed.

This process of obtaining alloys by sintering also encountered difficulties owing to the fact that the base material and the additions are in general of different specific weight and tend to segregate during the manufacture of the alloy and that no complete permeation is obtainable without a molten phase.

The inventor suggested in his Patent 2,148,040 to form agglomerated or composite bodies of a mixture consisting of higher and lower melting components, including iron as the lower melting component and carbon in the form of graphite or lamp black as the higher melting component. The lower melting component was to be comminuted into finest powder and then to be admixed in the desired ratio with carbon which is finely divided when lamp black is added; the mixture was thereafter to be densified in order to prevent segregation, and then to be subjected to compacting in an extrusion press, preferably at elevated temperature. According to that particular disclosure of the inventor, care had to be taken that the higher melting element remained in its solid state, and the lower melting element was caused to flow but not to melt. Consequently, according to that process a substantially agglomerated or composite body was obtained which very much resembled steel without, however, being exactly steel. Due to the fact that the lower melting metal, such as iron, was not permitted to melt, it could not dissolve the higher melting element, such as carbon. While it can readily be assumed that, in practicing his earlier invention, some dissolution of the added carbon occurred, no complete dissolution was feasible which is, however, essential for the formation of true steel.

Prior to issuance of his Patent 2,148,040 the inventor conceived the idea of modifying the method covered by that patent in such a way that melting of the iron base was secured while the mixture was undergoing extrusion in the press. The inventor eventually succeeded in perfecting a process of manufacturing alloys of two or more elements of the same or different melting points from an intimate mixture of the initial powdery components in desired ratio, and the completed alloy contained the components dissolved completely for practical purposes.

Therefore, it is an object of this invention to produce alloys of two or more elements of the same or different melting points from a powdery mixture substantially in an extrusion process.

It is another object of this invention to produce alloys of two or more elements from a powdery initial mixture in an extrusion process in such a way that the elements are dissolved and eventually form solid solutions to a desired and controllable high extent, or completely.

It is a particular object of the invention to manufacture from powdery initial mixtures steel alloys in which the additions to the iron base are evenly distributed in predetermined ratio and substantially dissolved when the alloy is completed.

These and other objects of the invention will be more clearly understood when the specification proceeds with reference to the drawing in which an apparatus including an extrusion press is shown by way of example, capable of performing the process according to the invention.

The drawing shows more schematically a cross section through the apparatus, with parts in elevation.

According to the invention the elements to be alloyed are comminuted as finely as possible, preferably to a size of the particles corresponding to a diameter of about 6 to 30 microns. Preferably the elements are comminuted separately and thereafter admixed in the exact proportion in which they are to be present in the completed alloy. The elements may also be mixed first in said ratio and the mixture thereafter comminuted to the desired size. It is to be understood that the elements may first be comminuted to a coarser size, then admixed in the desired ratio, and thereafter the mixture further comminuted to the desired smallest average size of its particles, preferably in a ball mill.

Some desirable elements for steel alloys, such as tungsten and molybdenum, are obtained from their oxide powders as available in the market in metallic state in a process which immediately gives finest powders. In such a case, those powders are admixed to iron which is either obtained by mechanical comminution, or in the form of finest powder, e. g., by chemical conversion of iron carbonyls.

The initial mixture prepared in any suitable manner is thereafter densified by pressing in a mold and, advantageously, heating into a preliminary somewhat coherent body of desired shape and size. While the pressure may be high, up to several hundreds, or even to a few thousands of kilograms per square centimeter, the heating temperature should not exceed pre-sintering temperatures of the mixture for reasons of economy and to avoid segregation.

The preliminary body thus obtained contains the elements in finest and uniform distribution. It is then inserted in an extrusion press.

Referring to the drawing, an extrusion press is shown there comprising a base 1 and a top member 2 connected by a suitable number of bolts 3 which may be screwed into the base member and provided with nuts 4 at the other end for pressing down the top member.

In a cylinder 5 a piston 6 is slidably arranged. Cylinder 5 is liquid-tightly inserted into a groove of the base member 1 and secured thereto by screws 7.

Water under suitably high pressure can be introduced below plunger 6 through tube 8. A shell or like support 9 spacedly surrounds cylinder 5 and is supported by base member 1. On top of shell 9 a cylindrical support 10 for a chamber 11 is arranged which substantially consists of a cylindrical lining 12 of metal, such as steel, and a mantle 13. A lunger 14 snugly fits into lining 12 and is connected with piston 6 by rod 15. A nozzle 16 of metal of great mechanical strength, such as steel alloy, is mounted on top of lining 12 and opens into a channel 17 formed by tube 18 of a heat resistant steel alloy, tungsten or molybdenum, and which preferably tapers slightly, by a few degrees, towards its upper open end. This tube may also consist of a refractory lining not reacting with the alloy to be formed therein, such as an alumina-, zirconia- or magnesia-composition which is reinforced on the outside by a mantle of steel or other strong alloy.

Tube 18 is surrounded by cylindrical mantle pieces 19 and 20.

Between lining 12 and mantle 13 an annular space 21 is left to receive one or more helically wound coils 22 and 23 preferably embedded in powdery refractory material. The coils are connected through cable 24 and rheostat 25 with a suitable source of electrical current 26, which may be a direct or alternating, and specifically a high frequency current.

Between tube 18 and mantle piece 19 an annular space 27 is left in which a number of coils 28, 29 is arranged which are connected through cable 30 and rheostat 31 with the source of electrical current 26.

Between tube 18 and mantle piece 20 another annular space 32 is left in which a hollow coil 33 is arranged in one or more co-axial rows.

A cooling medium, such as faucet water or even refrigerated water can be passed through tube 34 into coil 13. The cooling medium leaves the coil through tube 35.

A mantle 36 may also be provided around nozzle 14 and the lower portion of mantle 13 and passed by a number of tubes 37, 38 into which a cooling medium can be released by tubes (not shown).

In operation, plunger 6 is lowered into the position shown in the drawing, top member 2 and all parts above lining 12 are removed and a preliminary and somewhat coherent body prepared in the way described above is introduced into chamber 11 from above.

After the preliminary, coherent body has been inserted into chamber 11, the other parts of the press above the chamber are assembled.

Now a fluid under high pressure is admitted through tube 8 into cylinder 5 below piston 6 and thereby the latter is moved upwardly exerting an excessive pressure upon the preliminary body in chamber 11 and causing it to extrude through nozzle 16 into the tubular channel 17. Thereby the cross section of the body is reduced, e. g., four or many more times and highly densified and compacted. The particles of the preliminary bodies previously contacting each other only somewhat loosely, are shaped by the excessive pressure exerted upon them so that they are brought in closest contact over practically their entire surfaces.

The pressure exerted in the extrusion press may amount up to about 10,000 to 15,000 kilograms per square centimeter, and higher.

If desired, the preliminary body can be inserted in the extrusion press in a hot state as it is obtained, for instance, from the pre-sintering process.

The chamber 11 of the extrusion press may also be heated externally, if desired, in a controlled way in order to facilitate extrusion and to reduce the wear of the opening of the nozzle through which the body is to be extruded. To this effect, coils 22, 23 are provided. However, the body should not be of a temperature at which it melts, and preferably neither of a temperature at which it starts to flow. It being the purpose of the invention to densify in an extrusion process the powdery and already somewhat densified or coherent initial material to the highest degree possible, it is obvious that this purpose would be negated by heating the preliminary body before being extruded to a degree at which it starts to flow. A preliminary body heated to too high a degree would flow easily through nozzle 16 and neither excessive pressure nor desired densification could be obtained.

The preliminary body when pressed into the nozzle is extremely compacted and densified without offering to its components any possibility of segregating; while it travels through the adjoining channel 17, it is subjected to controlled heat treatment in order to obtain the desired crystalline structure of the alloy and to cause dissolution of the elements in each other.

To this effect, electrical current is applied to the coils 28, 29; the heat developed can be readily controlled by the rheostat 31. Thereby the highly compacted and densified strand portion travelling through this zone of channel 17 is quickly heated to a temperature at which it substantially melts. Thereby the minute particles of which the strand consists and which are in closest and full contact with each other, are caused to permeate and dissolve in each other and to alloy throughout. Since the just treated strand portion travels rapidly through this zone of channel 17, this high heat is applied only temporarily and locally, so as to produce a substantially instantaneous melting of the treated portion of the highly compressed mixture or strand, or at least of the base metal contained therein, and no segregation can occur.

If carbon is admixed to an iron base, preferably in the form of lamp black, it is present in about molecular distribution and though it will not melt, it will be easily dissolved in the melted iron base.

Since the melting temperature of iron is about 1480° C., it suffices to heat this zone of channel 17 to that temperature or slightly higher.

Since other admixtures, such as nickel and cobalt, melt at substantially the same temperature as iron, such heating temperature suffices also for the manufacture of iron alloys containing nickel and cobalt.

Molybdenum and tungsten are high melting metals. If they are admixed to iron to form steel alloys, they are present in small amounts, mostly equalling a few percents or fractions of one percent. As it is known, a mixture of molybdenum and tungsten in such small percentages with iron melts at practically the same temperature at which iron alone melts and, therefore, a temperature of about 1500° to 1600° C. will in general suffice to form a complete solid solution of these elements in all practical proportions for the manufacture of tungsten- and/or molybdenum steels.

If there is concerned, e. g., the manufacture of an alloy of cobalt, tungsten and chromium, it again depends upon the proportions of tungsten and chromium admixed, to which temperature the strand passing this zone of the channel is to be heated. Diagrams showing the eutectic or melting temperatures of mixtures of different elements dependent on their ratios are well known for all practical binary and ternary, etc. alloys, or easily to be established for new alloys (compare, e. g., Schwarz, "Metall- und Legierungskunde," second edition 1929, pages 94 ff. where such diagrams are shown for cobalt-molybdenum, cobalt-nickel, cobalt-tungsten, chromium-molybdenum, chromium-nickel, copper-iron, iron-manganese, iron-silicon, iron-titanium, manganese-nickel, nickel-tungsten, etc., as well as ternary and multiple compositions thereof). Hence it is easy to determine the temperature to which this zone of the channel and the strand is to be heated locally, and the material of tube 18, or its lining, is to be chosen accordingly.

The amount of heat to be conveyed to the highly compressed mixture or strand portion travelling through the heating zone depends essentially upon the heat capacity and speed of travel of that portion. In order to produce the quick or instantaneous heating and substantial melting of the portion of the mixture or strand travelling through the heating zone, proper controlling means for the heating current, such as a rheostat 31 are provided.

After the strand has passed this zone of the channel 17, it is immediately to be caused to solidify so that a compact and dense solid body, forming the desired alloy, is eventually obtained and leaves the channel.

For this purpose, the melted strand portion enters the upper zone of channel 17 which is cooled by the coils 33. Preferably the cooling medium enters the uppermost end of the coil and flows downwardly through it in opposite direction to that of the travel of the strand through the upper zone of tube 17. The cooling medium is heated while it flows downwardly through coil 33 and thereby a warmer cooling medium acts upon this melted strand just leaving the lower heated zone of tube 17, while the coldest cooling medium acts upon the upper already cooled portion of the strand. Thereby its solidification is secured before it leaves the upper end of tube 17. It has been found advantageous to slightly taper tube 17 at least in its upper portion so that some pressure is exerted upon the uppermost solidified strand portion and thereby upon the strand below while it is pressed upwardly through the channel, whereby highest density of the strand is maintained while entering of air and oxygen is prevented. A vacuum or a protective atmosphere may be applied to the upper end of the channel by means not shown.

It is to be understood that instead of a single coil 33 two or more coils can be arranged in space 32 and each of the coils cooled by the same cooling medium or different cooling media particularly different as to temperature. Thereby a gradual cooling of the strand travelling through the upper portion of channel 17 can be effected and controlled.

If quenching is desired, a cooling medium of correspondingly low temperature has to enter the lowest section of the cooling coils, and another cooling medium of desired temperature is to be passed through the upper section of the cooling coils.

This cooled upper portion of the channel has, in any case, to be long enough to allow solidification of the strand while travelling through it so that a solidified (though not necessarily absolutely cool) strand leaves eventually the channel which forms the desired alloy, in particular steel alloy.

In the same way, two or more coils can be arranged in space 27, not co-axial, as shown, but on top of each other, and each of the coils be heated independently from the other in the same manner as exemplified for the coils 27, 28. Thereby any desired kind or rule of heating the strand portion travelling upwardly through the lower part or zone of channel 17 can be effected. In particular, a travelling strand portion may be heated first to an intermediary temperature when it enters the lowermost portion of channel 17, thereupon heated quickly by another coil to melting temperature, and thereafter by a third coil arranged in the uppermost part of space 27 to a lower temperature. In the latter case, the melted strand portion actually gives up heat while passing the zone surrounded by the third coil, but undesired cooling is prevented by proper heating of that coil.

In case chamber 11 is heated, it sometimes has been found desirable to cool the lower portion thereof in order to prevent the plunger 14 from being unduly heated.

Instead of disassembling the upper part of the press for introducing a preliminary body into chamber 11, the supporting piece 10 can be spaced so far from base member 1 and cylinder 5 that upon withdrawal of piston 6 to the bottom of cylinder 5, plunger 14 is withdrawn from chamber 11 to such a distance that the preliminary body can be introduced into that chamber from below, e. g., through suitable openings in shell 9.

As will be appreciated from the above, the temperature to which the strand extruded into channel 17 is exposed, can be controlled in any desired way and thereby any treatment of the strand effected, resulting in solidification thereof in desired crystalline structure. Thus, e. g., also quenching can be effected.

It will be appreciated also that the length of channel 17 can be made so that the time during which a strand portion travels therethrough is adapted to the thermal treatment to which it is to be subjected, and particularly the heat to be applied for locally and substantially instantaneously melting the strand portion is confined to a larger or smaller length of the strand during a longer or shorter period of time, in order to secure melting of the strand, but to prevent segregation. To this effect, of course, also the diameter of the strand as well as its speed of travel through the channel must be properly adjusted. No figures can be given because these depend entirely upon the nature of the mixture under treatment, the pressure exercised in the extrusion press, and the temperature of the preliminary body, and can be established by simple experiment and calculation.

The advantages realized by the invention consist, among others, in the following.

The elements of the completed alloy are uniformly divided and substantially or completely dissolved.

In ordinary melting processes the elements to be alloyed are admixed in lump and other coarse form. They are melted in order to lose that shape whereby they come first into intimate contact over their entire surface, and then dissolve in each other. A total and uniform dissolution can mostly be obtained only upon long extended heating at high temperature at which the elements are liquefied to such a degree that they can readily permeate each other. Thereby it can occur that one or the other element is volatilized at least in part, or changes its composition. Sometimes stirring, such as caused by the pinch-effect in induction furnaces, is necessary in order to secure the desired uniform dissolution. If small amounts of additions are desired, mostly a pre-alloy, which is easier to be produced in exact ratios, has to be prepared in which the base metal and the addition are present in a by far higher ratio than desired in the complete alloy, and the pre-alloy has then to be added to the large bulk of the molten base metal. These are cumbersome processes which necessitate great care on the part of the workmen and are very expensive but nevertheless fail to answer all existing demands as to accuracy. According to the invention, one starts from an intimate mixture of finely divided powdery material which can be prepared in exact ratios. By forming a preliminary body, segregation during the subsequent treatment is prevented. By subjecting that preliminary, coherent body to excessive pressure in an extrusion press, the shape of the particles is changed (without affecting their uniform distribution) so that they adapt themselves to and contact each other practically over their entire surfaces, and are ready for immediate mutual dissolution. When afterwards heat is locally applied, it only serves to cause the minute particles, which are in full contact and still evenly and uniformly distributed, to permeate each other. That heat does not serve, however, to bring about the necessary change of the shape of the initial elements in order to bring them first into closest and full contact. Consequently, such localized heating according to the invention can be applied to an extruded strand portion substantially instantaneously, thereby suddenly melting the particles and causing their mutual permeation within the shortest possible period of time, and cooling is started thereafter immediately so that the melted and mutually dissolved particles are not given time to change their relative position, i. e., to segregate, but the original even and uniform distribution is maintained in the solidified body which forms the desired solid solution or alloy of the elements in even and uniform distribution.

The size of the crystal grains formed can be controlled by properly adjusting the temperatures as well as the length of the zones of the channel which the strand passes with given speed. The grain or crystal size can also be controlled by properly adjusting the speed of travel of the strand through those zones, i. e., by adequately controlling the pressure exercised upon it in the press.

The crystalline or grain structure of the alloy can further be controlled by proper selection of the size of particles in the initial powder of which the preliminary body is made.

What I claim is:

1. A process of manufacturing alloys of at least two elements, comprising the steps of intimately and uniformly admixing the elements in finely divided state and desired ratio, densifying the mixture so obtained into a preliminary body, subjecting said body to high pressure in an extrusion press and extruding it into confined space to form a dense strand therein, and subjecting said strand to thermal treatment in said confined space, said treatment being controlled so as to substantially melt successive portions of said strand and thereafter solidify them.

2. A process of manufacturing alloys of at least two elements, comprising the steps of intimately and uniformly admixing the elements in finely divided state and desired ratio, densifying the mixture so obtained into a coherent body by subjecting it to a compacting treatment including heating to pre-sintering temperature, subjecting said compacted body to high pressure considerably exceeding any pressure applied in forming said compacted body, in an extrusion press and extruding it into confined space to form a dense strand therein, and subjecting said strand to thermal treatment in said confined space, said treatment being controlled so as to substantially melt locally successive portions of said strand and thereafter solidify them.

3. A process of manufacturing alloys of at least two elements, comprising the steps of intimately and uniformly admixing the elements in finely divided state and desired ratio, compacting the mixture so obtained into a preliminary body, subjecting said body to high pressure in an extrusion press at elevated temperature controlled to be below a temperature at which any element contained in said body starts to flow, and extruding said body into confined space to form a dense strand therein, and subjecting said strand to thermal treatment in said confined space, said treatment being controlled so as to substantially melt locally successive portions of said strand and thereafter solidify them.

4. A process of manufacturing alloys of at least two elements, comprising the steps of intimately and uniformly admixing the elements in finely divided state and desired ratio, compacting the mixture so obtained into a preliminary body, subjecting said body to high pressure in an extrusion press and extruding it into confined space to form a dense strand therein, subjecting said strand while travelling through said space to local thermal treatment, said treatment comprising controlled heating and subsequent cooling so as to substantially melt and thereafter solidify successive portions of said strand.

5. A process of manufacturing alloys of at least two elements, comprising the steps of intimately and uniformly admixing the elements in finely divided state and desired ratio, compacting the mixture so obtained into a preliminary body, subjecting said body to high pressure in an extrusion press and extruding it into confined space to form a dense strand therein, and subjecting said strand to thermal treatment in said confined space, said treatment being controlled so as to heat and then cool locally successive portions of said strand, the heat applied being controlled to be sufficient to produce a substantially instantaneous melting of at least one element contained in exposed portions of said strand, said cooling being applied immediately after to portions of said strand thus melted so as to substantially solidify them.

6. A process of manufacturing alloys of at least two elements, comprising the steps of intimately and uniformly admixing the elements in desired ratio and finely divided state corresponding to an average particle size of 6 to 30 microns, densifying the mixture so obtained into a preliminary body, subjecting said body to high pressure in an extrusion press and extruding it into confined space to form a dense strand therein, and subjecting said strand to thermal treatment in said confined space, said treatment being controlled so as to substantially melt successive portions of said strand and thereafter solidfy them.

7. A process of manufacturing alloys of at least two elements, comprising the steps of intimately and uniformly admixing the elements in finely divided state and desired ratio, densifying the mixture so obtained into a preliminary body, subjecting said body to high pressure in an extrusion press and extruding it upwardly against the action of gravity into confined space to form a dense strand moving upwardly therein, and subjecting said strand to thermal treatment in said confined space, said treatment being controlled so as to substantially melt successive portions of said strand and thereafter solidify them.

8. A process of manufacturing an iron alloy containing an iron base and at least one additional element capable of combining therewith, comprising the steps of admixing in desired ratio finely comminuted iron powder intimately and uniformly with the desired additional element also in finely divided state, compacting the mixture into a preliminary body, subjecting said body to excessive high pressure in an extrusion press and extruding it into confined space to form a dense strand therein, and subjecting said strand to thermal treatment in said confined space, said treatment being controlled so as to melt substantially in successive portions of said strand at least the iron base and dissolve therein and combine therewith said additional element, and then to solidify substantially said portions.

9. A process of manufacturing an iron alloy containing an iron base and at least one additional element capable of combining therewith, comprising the steps of admixing in desired ratio iron powder comminuted to an average particle size of about 6 to 30 microns intimately and uniformly with the desired additional element in similar finely divided state, densifying the mixture so obtained by subjecting it to a compacting treatment including heating so as to obtain a coherent body, said heating controlled to produce pre-sintering of said mixture, thereafter subjecting said body to excessive high pressure in an extrusion press and extruding it upwardly into confined space to form a dense strand therein, subjecting successive portions of said strand while travelling upwardly through said space and being under pressure to thermal treatment comprising heating and subsequent cooling, said heating being controlled so as to melt substantially instantaneously at least the iron base and dissolve therein and combine therewith said additional element contained in said portions, said cooling effecting substantial solidification of said portions.

10. A process of manufacturing alloys of at least two elements capable of being combined therein, comprising the steps of intimately and uniformly admixing the elements in finely divided state and desired ratio, densifying the mixture so obtained and highly compressing it in an extrusion press, extruding it into confined space and subjecting it while under substantial pressure to thermal treatment in said confined space, said treatment being controlled so as to substantially melt and thereafter solidify successive extruded portions of said mixture.

11. A process of manufacturing alloys of at least two elements capable of being combined therein, comprising the steps of intimately and uniformly admixing the elements in finely divided state and desired ratio, densifying the mixture so obtained and highly compressing it in an extrusion press, extruding it into confined space and subjecting it while under substantial pressure to thermal treatment in said confined space, said treatment being controlled so as to melt substantially instantaneously and locally and thereafter solidify successive extruded portions of said mixture.

12. An apparatus for producing alloys containing at least two elements, comprising an extrusion press having an aperture through which a mixture of said elements is to be extruded and a channel associated with said aperture to form a continuation thereof, means for affecting the temperature within said channel and means for controlling the temperatures produced in said channel by said former means.

13. An apparatus for producing alloys containing at least two elements, comprising an upwardly working extrusion press having an aperture at its top through which a mixture of said elements is to be extruded and a channel on top of and associated with said aperture, heating means for affecting the temperature within said channel and coils to carry a cooling medium, and means for controlling the temperatures produced in said channel by said former means.

14. An apparatus for producing alloys containing at least two elements, comprising an upwardly working extrusion press having an extrusion aperture and a channel on top of and associated with said aperture, heating means arranged around the lower portion of said channel adapted to produce a temperature in said channel equivalent to the melting temperature of a strand extruded into and passing through said channel, cooling means arranged around the upper portion of said channel, and means for controlling the temperature produced at least by said heating means.

15. In an apparatus as described in claim 12, said channel being tapered slightly towards its upper end.

16. In an apparatus as described in claim 13, said channel being tapered slightly towards its upper end.

17. In an apparatus as described in claim 14, said channel being tapered slightly towards its upper end.

PAUL SCHWARZKOPF.